(12) United States Patent
Tachibanada et al.

(10) Patent No.: US 9,261,169 B2
(45) Date of Patent: *Feb. 16, 2016

(54) AUTOMATIC TRANSMISSION CONTROLLER

(71) Applicant: HONDA MOTOR CO., LTD., Tokyo (JP)

(72) Inventors: Yuya Tachibanada, Wako (JP); Yutaka Ishikawa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/294,053

(22) Filed: Jun. 2, 2014

(65) Prior Publication Data

US 2014/0364267 A1 Dec. 11, 2014

(30) Foreign Application Priority Data

Jun. 11, 2013 (JP) .................................. 2013-123165

(51) Int. Cl.
*F16H 3/66* (2006.01)
*F16H 61/00* (2006.01)

(52) U.S. Cl.
CPC .................. *F16H 3/66* (2013.01); *F16H 3/666* (2013.01); *F16H 61/0059* (2013.01);
(Continued)

(58) Field of Classification Search
CPC .................... F16H 2200/0069; F16H 2312/04; F16H 2059/6823; F16H 59/40; F16H 61/20; F16H 2061/207; F16H 2061/6608; Y10T 477/837; Y10T 477/847; B60T 7/122
USPC .......................................... 477/192, 195, 901
See application file for complete search history.

(56) References Cited

U.S. PATENT DOCUMENTS 6,021,880 A * 2/2000 Reed et al. ................. 192/219.3
6,591,705 B1 * 7/2003 Reik et al. ....................... 74/343
(Continued)

FOREIGN PATENT DOCUMENTS

JP 09-264419 10/1997
JP 4839865 B2 8/2007
(Continued)

OTHER PUBLICATIONS

Japanese Office Action for corresponding JP Application No. 2013-123165, Aug. 10, 2015.

*Primary Examiner* — Roger Pang
(74) *Attorney, Agent, or Firm* — Mori & Ward, LLP

(57) ABSTRACT

An automatic transmission controller for controlling an automatic transmission includes a neutral controller which is configured to perform neutral control, a neutral control permission determiner, and an engagement controller. The automatic transmission includes a plurality of planetary gear mechanisms and a plurality of engagement mechanisms. One of the plurality of engagement mechanisms is a mechanical engagement mechanism. The engagement controller is configured to allow rotation of an input shaft of the automatic transmission in a case where the neutral control determiner permits the neutral control and configured to set the plurality of engagement mechanisms including at least the mechanical engagement mechanism so as to fix an output shaft of the automatic transmission to a casing of the automatic transmission in a case where the output shaft of the automatic transmission is rotated by a wheel of a vehicle in a rotational direction such that the vehicle moves backward.

11 Claims, 12 Drawing Sheets

(52) U.S. Cl.
CPC .................. *F16H 2200/0069* (2013.01); *F16H 2200/2012* (2013.01); *F16H 2200/2046* (2013.01); *F16H 2200/2082* (2013.01); *F16H 2312/04* (2013.01)

(56) References Cited

U.S. PATENT DOCUMENTS

| | | | |
|---|---|---|---|
| 6,675,668 B2 * | 1/2004 | Schamscha | 74/340 |
| 2014/0256497 A1 * | 9/2014 | Ishikawa et al. | 475/269 |
| 2014/0350808 A1 * | 11/2014 | Tachibanada et al. | 701/58 |
| 2014/0364276 A1 * | 12/2014 | Tachibanada et al. | 477/93 |

FOREIGN PATENT DOCUMENTS

| | | |
|---|---|---|
| JP | 2007-271019 | 10/2007 |
| JP | 4711443 B2 | 4/2009 |
| JP | 2012-97826 | 5/2012 |
| JP | 2012-237377 | 12/2012 |

* cited by examiner

FIG. 2A

| | |
|---|---|
| PGS1 | 2.681 |
| PGS2 | 1.914 |
| PGS3 | 1.614 |
| PGS4 | 2.734 |

FIG. 2B

| | RATIO | STEP | |
|---|---|---|---|
| R1 | 4.008 | | 76.6% |
| 1st | 5.233 | 1-2 | 1.554 |
| 2nd | 3.367 | 2-3 | 1.465 |
| 3rd | 2.298 | 3-4 | 1.348 |
| 4th | 1.705 | 4-5 | 1.251 |
| 5th | 1.363 | 5-6 | 1.363 |
| 6th | 1.000 | 6-7 | 1.273 |
| 7th | 0.786 | 7-8 | 1.196 |
| 8th | 0.657 | 8-9 | 1.126 |
| 9th | 0.584 | 9-10 | 1.12 |
| 10th | 0.520 | SPREAD | 10.061 |

FIG. 3

|      | F1 | B1 | B2 | C1 | C3 | C2 | B3 |
|------|----|----|----|----|----|----|----|
| RVS1 | O  |    | O  |    | O  |    |    |
| 1st  | O  | O  | O  |    |    |    |    |
| 2nd  |    | O  | O  |    |    | O  |    |
| 3rd  |    | O  | O  |    | O  |    |    |
| 4th  |    | O  |    |    | O  | O  |    |
| 5th  |    | O  |    | O  | O  |    |    |
| 6th  |    |    |    | O  | O  | O  |    |
| 7th  |    |    | O  | O  | O  |    |    |
| 8th  |    |    | O  | O  |    | O  |    |
| 9th  |    |    | O  | O  |    |    | O  |
| 10th |    |    |    | O  |    | O  | O  |

FIG. 7A  FIG. 7B  FIG. 7C

| REVERSE GEAR (RVS1) | FIRST GEAR (1st) | SECOND GEAR OR HIGHER (2nd TO 10th) |
|---|---|---|
| CONNECTION STATE (R) | CONNECTION STATE (F) | CONNECTION STATE (F) |
| ENGINE BRAKE LOCKED / DRIVE LOCKED (P2 CARRIER) | DRIVE LOCKED / IDLING FREE (P2 CARRIER) | FREE (P2 CARRIER) |
| LOCKED STATE | LOCKED WHEN FIRST GEAR IS DRIVEN FREE WHEN FIRST GEAR IS NOT DRIVEN | SECOND GEAR OR HIGHER IS FREE |

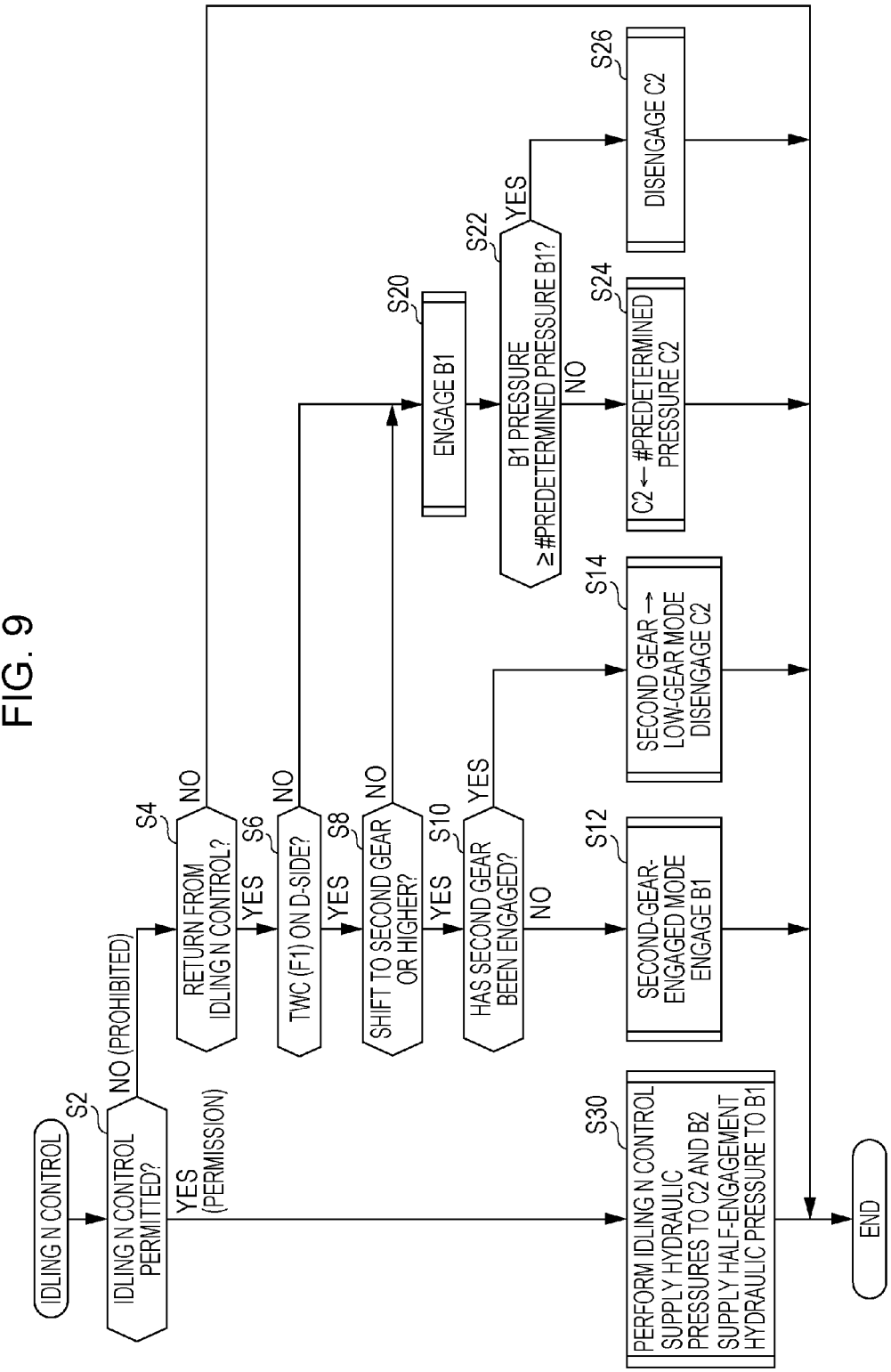

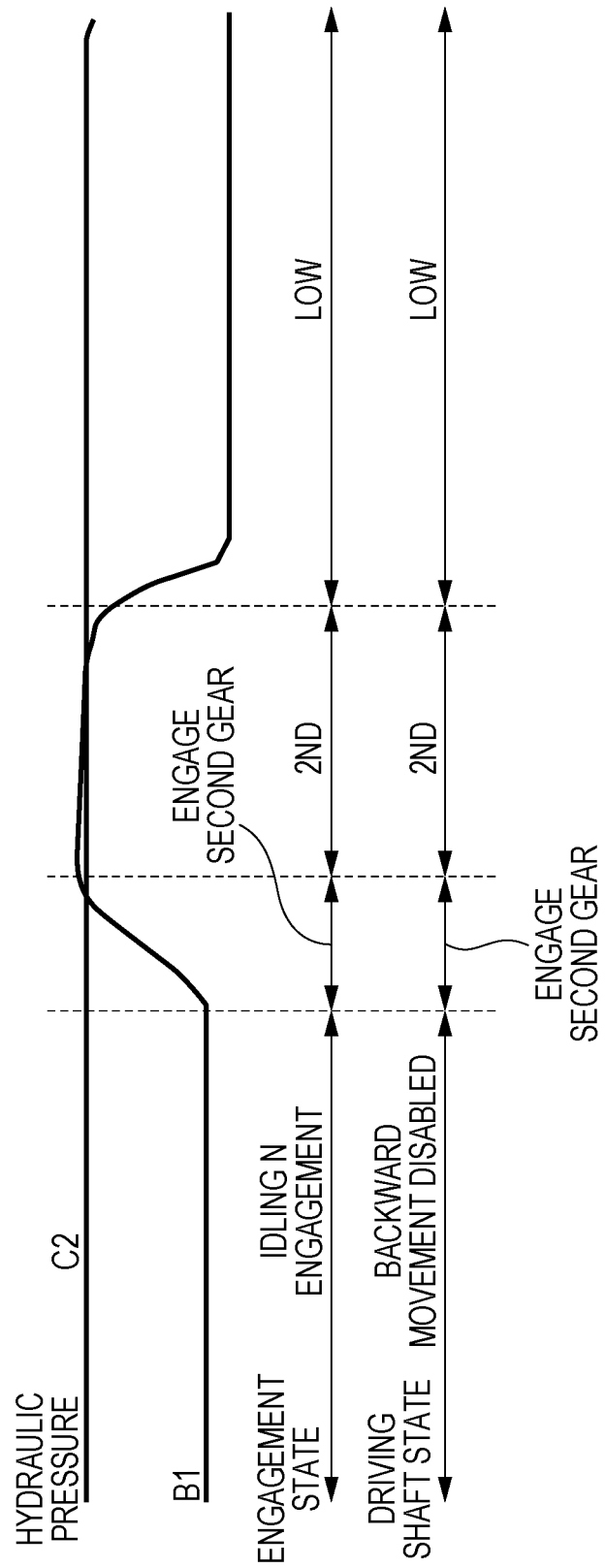

AUTOMATIC TRANSMISSION CONTROLLER

CROSS-REFERENCE TO RELATED APPLICATIONS

The present application claims priority under 35 U.S.C. §119 to Japanese Patent Application No. 2013-123165, filed Jun. 11, 2013, entitled "Automatic Transmission Controller." The contents of this application are incorporated herein by reference in their entirety.

BACKGROUND

1. Field

The present disclosure relates to an automatic transmission controller.

2. Description of the Related Art

To improve driving performance and drivability, the number of gear ratios of an automatic transmission for an automobile is being increased. In general, an automatic transmission includes engagement mechanisms, such as planetary gear mechanisms, clutches, and brakes. The gear ratio of the automatic transmission is changed by changing the power transmission path by using the engagement mechanisms. Such an automatic transmission includes a torque converter (starting mechanism) that is disposed between a drive source and a driving wheel of a vehicle and that transmits rotational power from the drive source to the driving wheel.

In recent years, automatic transmission controllers that perform so-called "idling neutral control" when a vehicle stops have been increasingly used. The term "idling neutral control" (hereinafter referred to as "idling N control") refers to control in which the automatic transmission is automatically changed to an idle neutral mode in order to reduce energy loss in the torque converter when the vehicle stops.

When a vehicle that performs idling N control stops on, for example, an uphill slope, it is not possible to prevent backward movement of the vehicle on the slope because the torque converter does not have a creep torque or has only a very small creep torque.

For example, Japanese Patent No. 4711443 describes an automatic transmission controller that detects the inclination angle of a slope with high precision by using a rotation sensor for detecting a backward slope in order to prevent backward movement of the vehicle when control of the vehicle is returned from idling N control. The rotation sensor, which actively detects backward movement, has a special structure because it is difficult for an ordinary sensor to detect backward movement of a vehicle because the rotational speed of a wheel of the vehicle is low when the vehicle moves backward.

Japanese Patent No. 4839865 describes an automatic transmission controller that detects the inclination angle at a position at which a brake of a vehicle is operated by detecting the master cylinder pressure of the brake. The automatic transmission controller includes a brake hydraulic pressure sensor for detecting the amount by which a brake pedal is depressed. If the brake hydraulic pressure detection sensor detects a hydraulic pressure that is greater than or equal to a predetermined value A, a brake-pedal-depression condition is satisfied and a creeping-prevention control (neutral control) is performed. There is a difference between the threshold of the amount by which the brake pedal is depressed for starting neutral control and the threshold for returning from neutral control, that is, there is so-called hysteresis between the conditions for starting and returning from the control. Therefore, starting of neutral control when the driver does not intend to can be prevented. Moreover, because neutral control is not started unless the brake pedal is depressed by a considerable amount, the automatic transmission controller has an advantage in that a vehicle can be driven very easily when parallel-parking or garaging the vehicle, for which it is necessary to drive the vehicle at a creeping speed or less.

SUMMARY

According to one aspect of the present invention, an automatic transmission controller for controlling an automatic transmission includes a neutral controller, a neutral control permission determiner, and an engagement controller. The automatic transmission transmits a driving force from a drive source to a wheel of a vehicle while shifting the driving force by selecting a gear ratio from a plurality of gear ratios in accordance with a driving state of the vehicle. The automatic transmission includes a starting mechanism, a plurality of planetary gear mechanisms, and a plurality of engagement mechanisms. The starting mechanism is connected to the drive source. The plurality of planetary gear mechanisms each include rotation elements that are a sun gear, a carrier, and a ring gear. The plurality of engagement mechanisms connect or hold fixed the rotation elements of the planetary gear mechanisms and set the plurality of gear ratios of the automatic transmission by means of a combination of engagements between the plurality of engagement mechanisms and the rotation elements. One of the plurality of engagement mechanisms is a mechanical engagement mechanism that permits switching of a rotational direction of one of the rotation elements of the plurality of planetary gear mechanisms. The neutral controller performs neutral control in which transmission of the driving force from the drive source to an output shaft is stopped so as to allow the mechanical engagement mechanism to switch the rotational directions for a forward gear and a reverse gear and to allow rotation in each of the forward gear and the reverse gear. The neutral control permission determiner determines whether or not to permit the neutral control. The engagement controller, when the neutral control determiner permits the neutral control, allows rotation of an input shaft of the automatic transmission, and, in a case where the output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission.

According to another aspect of the present invention, an automatic transmission controller for controlling an automatic transmission includes a neutral controller, a neutral control permission determiner, and an engagement controller. The automatic transmission transmits a driving force from a drive source to a wheel of a vehicle while shifting the driving force by selecting a gear ratio from a plurality of gear ratios in accordance with a driving state of the vehicle. The automatic transmission includes a starting mechanism, a plurality of planetary gear mechanisms, and a plurality of engagement mechanisms. The starting mechanism is connected to the drive source. The plurality of planetary gear mechanisms each include rotation elements including a sun gear, a carrier, and a ring gear. The plurality of engagement mechanisms connect or hold fixed the rotation elements of the planetary gear mechanisms and set the plurality of gear ratios of the automatic transmission by means of a combination of engagements between the plurality of engagement mechanisms and the rotation elements. One of the plurality of engagement mechanisms is a mechanical engagement mechanism that permits switching of a rotational direction of one of the rotation elements of the plurality of planetary gear mechanisms. The neutral controller is configured to perform neutral control in which transmission of the driving force from the drive source to an output shaft is stopped so as to allow the mechanical engagement mechanism to switch the rotational directions for a forward gear and a reverse gear and to allow rotation in each of the forward gear and the reverse gear. The neutral control permission determiner is configured to determine whether or not to permit the neutral control. The engagement controller is configured to allow rotation of an input shaft of the automatic transmission in a case where the neutral control determiner permits the neutral control and configured to set the plurality of engagement mechanisms including at least the mechanical engagement mechanism so as to fix the output shaft of the automatic transmission to a casing of the automatic transmission in a case where the output shaft of the automatic transmission is rotated by a wheel of the vehicle in a rotational direction such that the vehicle moves backward.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A is a table showing the gear ratios of four planetary gear mechanisms of the automatic transmission shown in FIG. 1A.

FIG. 2B is a table showing the final gear ratios, including ten forward gears and one reverse gear, obtained by using the four planetary gear mechanisms having the gear ratios shown in FIG. 2A in the automatic transmission shown in FIG. 1A.

FIG. 3 is a table showing a pattern of combination of engagement or disengagement of three clutches and three brakes with which gear ratios shown in FIG. 2B are obtained by using the automatic transmission shown in FIG. 1A.

FIG. 7A illustrates a TWC in a state in which it is locked in both rotational directions.

FIG. 7B illustrates the TWC in a state in which it is locked in a counterclockwise direction.

FIG. 7C illustrates the TWC in a state in which it is free in both rotational directions.

FIG. 9 is a flowchart illustrating a process of controlling the automatic transmission according to the embodiment, the process being performed when stopping idling N control.

FIG. 10B illustrates control logic used in the control process of FIG. 9 to prevent a shift shock when changing from idling N control to second gear.

DESCRIPTION OF THE EMBODIMENTS

Figure 1A:
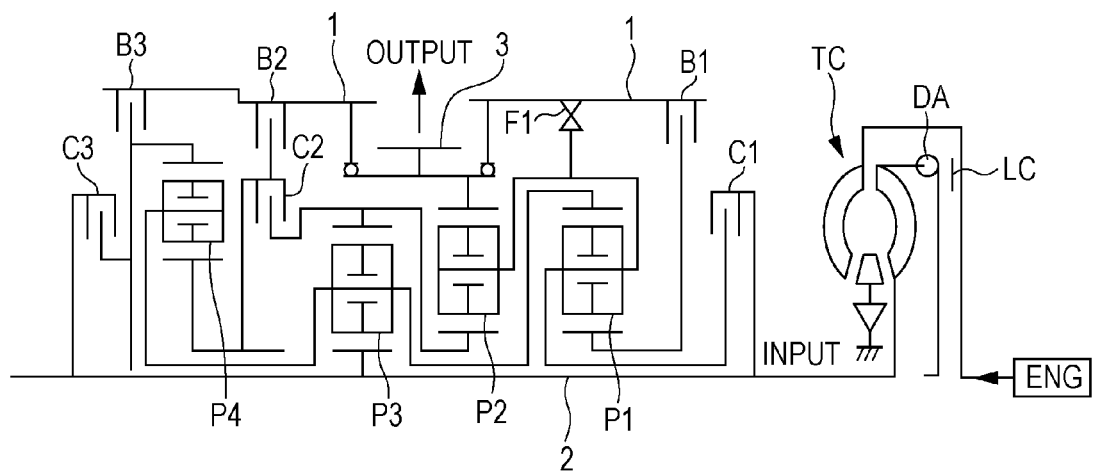
FIG. 1A is a skeleton diagram of an automatic transmission according to an embodiment of the present disclosure.

The embodiments will now be described with reference to the accompanying drawings, wherein like reference numerals designate corresponding or identical elements throughout the various drawings.

Structure of Engagement Mechanism of Automatic Transmission

FIG. 1A illustrates an automatic transmission according to an embodiment of the present disclosure, which has ten forward gears and one reverse gear. The automatic transmission includes a casing 1, an input shaft 2, and an output member 3. The input shaft 2 is rotatably supported in the casing 1. A driving force that is output from a drive source ENG, such as an internal combustion engine or the like, is transmitted to the input shaft 2 through a torque converter TC that includes a lock-up clutch LC and a damper DA. The output member 3 includes an output gear that is disposed coaxially with the input shaft 2. Rotation of the output member 3 is transmitted to left and right driving wheels of a vehicle through a differential gear (not shown) and a propeller shaft (not shown. Instead of the torque converter TC, a single-disc or multi-disc starting clutch, which is configured to be frictionally engageable, may be used.

First to fourth planetary gear mechanisms P1 to P4 are disposed in the casing 1 so as to be coaxial with the input shaft 2.

Figure 1B:
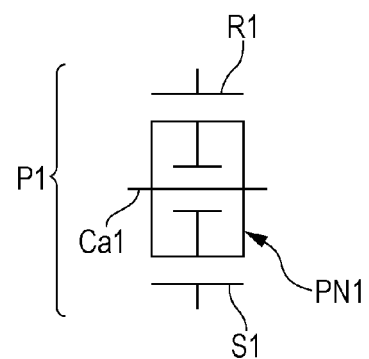
FIG. 1B is a block diagram of a representative one of planetary gear mechanisms of the automatic transmission shown in FIG. 1A.

Each of the four planetary gear mechanisms P1 to P4 is a so-called single-pinion planetary gear mechanism. For example, the planetary gear mechanism P1 includes, as shown in FIG. 1B from below, a sun gear S1, a pinion PN1, a carrier Ca1 that rotatably and revolvably supports the pinion PN1, and a ring gear R1 that meshes with the sun gear S1 and the pinion PN1. (This planetary mechanism is also called a minus planetary gear mechanism or a negative planetary gear mechanism because the sun gear and the ring gear rotate in opposite directions when the carrier is held fixed. When the ring gear is held fixed, the sun gear and the carrier rotate in the same direction.)

In addition to the four single-pinion planetary gear mechanisms P1 to P4, the automatic transmission according to the embodiment includes clutches C1 to C3 and brakes B1 to B3 so that the automatic transmission can have forward ten gears. Each of the clutches C1 to C3 disengageably connects one rotational element to another. One side of each of the brakes B1 to B3 is connected to the casing 1 so that the brakes B1 to B3 can reduce a rotational driving force. The clutches C1 to C3 and the brakes B1 to B3 are examples of "engagement mechanisms" of the embodiment of the present disclosure.

Each of the clutches C1 to C3 and the brakes B1 to B3 includes a so-called wet clutch disc or a brake disc that are hydraulically driven.

In the present specification and the drawings, a symbol "Ca" is used to denote a "carrier" in a planetary gear mechanism. A symbol "C" is used to denote a so-called "clutch", which is not included in a planetary gear mechanism and disengageably transmits a rotational driving force from one rotational element to another.

The automatic transmission according to the embodiment illustrated in FIG. 1A includes a two-way clutch (TWC) F1. The TWC F1 can selectively function as a brake or a clutch, and one end of the TWC F1 is fixed to the casing 1.

As illustrated in FIG. 1A, the automatic transmission according to the present embodiment includes the four planetary gear mechanisms (P1 (or "PGS1") to P4 (or "PGS4")) and the seven engagement mechanisms described above (the three clutches C1 to C3, the TWC F1 as a mechanical engagement mechanism, and the three brakes B1 to B3), which are connected to each other as shown in FIG. 1A. By changing the combination of ON/OFF states of these mechanisms as shown in FIG. 3, the automatic transmission can realize one reverse gear (R1) and ten forward gears (first to tenth gears) shown in FIG. 2B.

The embodiment of the present disclosure provides an automobile transmission controller that can prevent unintentional backward movement (that is, reverse rotation of driving wheels) of a vehicle when control of the vehicle is changed from idling N control to normal control. In view of this, the values of gear ratios of the planetary gear mechanisms shown in FIG. 2A, the number of gear ratios shown in FIG. 2B, and the values of gear ratios shown in FIG. 2B are not essential for the present disclosure. In other words, the present disclosure is applicable to any transmission having planetary gear mechanisms of any structures, any number of gear ratios, and any gear ratios.

For the same reason, the present disclosure is not limited to eleven gear ratios obtained by means of combinations of engagements of seven engagement mechanisms and four planetary gear mechanisms shown in FIG. 3.

Two-Way Clutch (TWC)

In the automatic transmission shown in FIG. 1A, the clutches C1 to C3 are called "clutches" and the brakes B1 to B3 are "brakes" due to the difference in their uses. However, they all have clutch mechanisms. A "clutch" transmits or does not transmit rotational motion input thereto by being engaged or disengaged. A "brake", one side of which is fixed to the casing 1 of the automatic transmission or the like, decelerates or does not decelerate rotational motion input thereto by being engaged or disengaged.

The TWC (F1) according to the embodiment provides three states relating to input rotations in forward and reverse directions, which are opposite each other, and output rotations in forward and reverse directions, which are opposite each other:
(i) the TWC locks forward rotation and reverse rotation;
(ii) the TWC locks forward rotation (or reverse rotation), but allows reverse rotation (or forward rotation) to be free; and
(iii) the TWC allows forward rotation and reverse rotation to be free.

Based on such function of the TWC (or F1), the TWC is a "mechanical engagement mechanism", whereas the clutch and the brake are "engagement mechanisms". To be specific, the TWC is an "engagement mechanism that can change the rotational direction of a rotation element of a planetary gear mechanism".

Figure 4A:
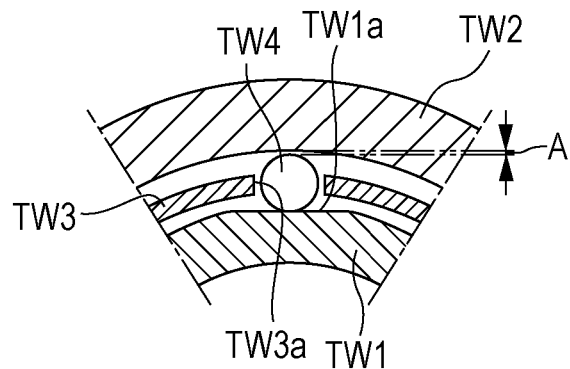
FIG. 4A illustrates a two-way clutch (TWC) used in the automatic transmission according to the embodiment in an initial state (in which the clutch is freely rotatable in two directions).
Figure 4B:
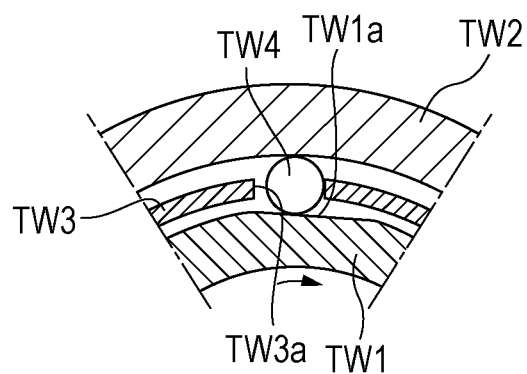
FIG. 4B illustrates the TWC in a state in which the clutch is freely rotatable in one direction.

Referring to FIGS. 4A and 4B, the two-way clutch F1, which is a "mechanical engagement mechanism" according to the present embodiment, will be described.

As illustrated in FIGS. 4A and 4B, the engagement mechanism F1 according to the present embodiment, which is a two-way clutch (TWC), includes an inner ring TW1, an outer ring TW2, and a retention ring TW3. The inner ring TW1 is connected to a rotational body in which the carrier Ca1 of the planetary gear mechanism P1 and the carrier Ca2 of the planetary gear mechanism P2 (in the embodiment shown in FIG. 1A) are coupled to each other. The outer ring TW2 is disposed outward from the inner ring TW1 in the radial direction with a predetermined distance therebetween and is connected to the casing 1. The retention ring TW3 is disposed between the inner ring TW1 and the outer ring TW2.

The three rings TW1 to TW3 have substantially cylindrical shapes extending along the rotation axis thereof. On the outer peripheral surface of the inner ring TW1, a plurality of cam faces TW1a are formed along the outer peripheral surface with equal distances therebetween. The cam faces TW1a may be planar or concave. A plurality of cutout holes TW3a are formed in the retention ring TW3 so as to correspond to the plurality of cam faces TW1a of the inner ring TW1. Rollers TW4 are disposed in the cutout holes TW3a. The diameter of each of the cutout holes TW3a formed in the retention ring TW3 is slightly greater than the diameter of each of the rollers TW4.

Cam faces are not formed on the inner peripheral surface of the outer ring TW2, in contrast to the outer peripheral surface of the inner ring TW1, on which the cam faces TW1a are formed. The distance between the inner peripheral surface of the outer ring TW2 and the outer peripheral surface of the inner ring TW1 is less than the diameter of the roller TW4. However, the distance between each of the cam faces TW1a of the inner ring TW1 and the inner peripheral surface of the outer ring TW2 measured at the center position of the cam face TW1a in the rotational direction of the ring (which is substantially the largest at the center position) is greater than the diameter of the roller TW4 (by a distance A in the example shown in FIG. 4A).

Therefore, as illustrated in FIG. 4A, in a state in which the inner ring TW1 is disposed at the innermost position, the retention ring TW3 is disposed at the middle position, the outer ring TW2 is disposed at the outermost position, and each of the rollers TW4 is disposed in a corresponding one of the cutout holes TW3a of the retention ring TW3, the rollers TW4 are rotatable in the cutout holes TW3a and between the inner peripheral surface of the outer ring and the cam faces of the inner ring.

The two-way clutch TWC shown in FIGS. 4A and 4B (F1 (TWC) in FIG. 1A) includes first and second electromagnetic clutches 30 and 31 described below (see FIG. 5). The first electromagnetic clutch 30 connects the outer ring TW2 to the retention ring TW3 when electric current is applied thereto. When electric current is not applied to the first electromagnetic clutch 30, the retention ring TW3 can rotate freely relative to the inner ring TW1 and the outer ring TW2.

Figure 5:
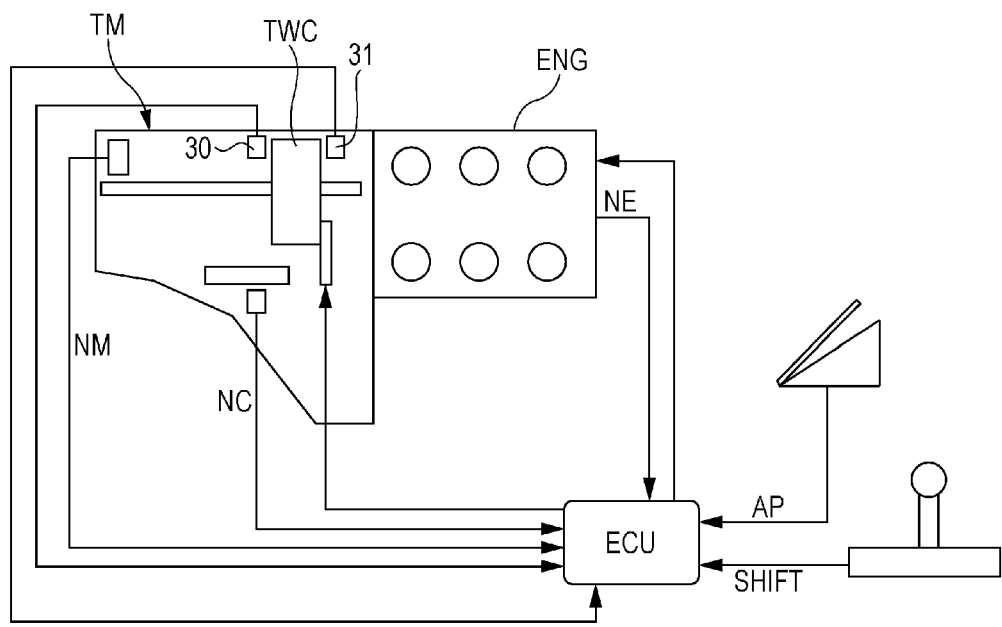
FIG. 5 illustrates signals that are exchanged between an automatic transmission controller (ECU) and the automatic transmission according to the embodiment.

The TWC shown in FIGS. 4A and 4B, that is, the clutch F1 shown in FIG. 1A controls engagement of the outer ring and the inner ring by performing ON/OFF control of application of electric current to the first electromagnetic clutch 30 (shown in FIG. 5). As described above, the outer ring TW2 is fixed to the casing 1, and the inner ring TW1 is coupled to the rotational body in which the carrier Ca1 of the planetary gear mechanism P1 and the carrier Ca2 of the planetary gear mechanism P2 are coupled to each other. Therefore, when electric current is applied to the first electromagnetic clutch 30, the outer ring TW2 and the inner ring TW1 become coupled to each other. As a result, the carriers of the planetary gear mechanism P1 and the planetary gear mechanism P2 become locked.

When electric current is not applied to the first electromagnetic clutch 30, the inner ring TW1 is free. Therefore, the states of the planetary gear mechanisms P1 and P2 depend on the engagement/disengagement of the clutches C1 to C3 and the brakes B1 to B3.

When electric current is applied to the first electromagnetic clutch, the retention ring TW3 is fixed to the casing 1 through the outer ring TW2. In this case, as illustrated in FIG. 4B, the outer ring TW2 is locked by the casing 1 and the retention ring TW3 is fixed to the inner ring TW1. Therefore, when the inner ring TW1 attempts to rotate in any of the forward rotation and the reverse rotation, the roller TW4, which is substantially integrated with the retention ring TW3, is located at the downstream end of the cam face TW1a in the rotational direction of the inner ring TW1 and the retention ring TW3.

FIG. 4B illustrates a state in which the roller TW4 is in contact with the right end of the cutout hole TW3a as the inner ring TW1 and the retention ring TW3 integrally rotate in the counterclockwise direction. At this time, the roller TW4 is held between the cam face TW1a and the inner peripheral surface of the outer ring TW2, and rotation of the inner ring TW1 is inhibited by the outer ring TW2, which is coupled to the casing 1. In other words, the two-way clutch TWC is locked.

An operation of the second electromagnetic clutch 31 (shown in FIG. 5) will be described.

The state of the second electromagnetic clutch is switchable between a first state, a second state, and an open state. In the first state, as illustrated in FIG. 4B, the retention ring TW3 is connected to the inner ring TW1 in a state in which the cutout hole TW3a is located at the right end of the cam face TW1a. In the second state, the retention ring TW3 is connected to the inner ring TW1 in a state in which the cutout hole TW3a is located at the other end of the cam face TW1a. In the open state, the retention ring TW3 is disconnected from the inner ring TW1.

The clockwise direction in FIGS. 4A and 4B is defined as the reverse rotational direction. The two-way clutch TWC disconnects the outer ring TW2 from the retention ring TW3 by stop supplying (turning off) electric current to the first electromagnetic clutch and enters a reverse-rotation inhibiting state by causing the second electromagnetic clutch to be in the first state.

In other words, one end of the TWC is fixed to the casing 1; and the carrier Ca1 of the planetary gear mechanism P1 and the carrier Ca2 of the planetary gear mechanism P2 are coaxially connected to the input shaft of the TWC. Therefore, with a first electromagnetic clutch signal and a second electromagnetic clutch signal, rotation of each of the carrier Ca1 and the carrier Ca2 can be in the following four states:
(i) the rotation is locked in forward direction and reverse direction;
(ii) the rotation is locked in forward direction, but is free in reverse direction;
(iii) the rotation is free in forward direction, but is locked in reverse direction; and
(iv) the rotation is free in forward direction and reverse direction. However, because the TWC (F1) is used together with the planetary gear mechanism P2, it is sufficient that the TWC (F1) can control the rotation to be in the following three states as illustrated in FIGS. 7A to 7C:
(i) the rotation is locked in forward direction and reverse direction;
(ii) the rotation is free in forward direction, but is locked in reverse direction; and
(iii) the rotation is free in forward direction and reverse direction.

Control Process

FIG. 5 illustrates the structure of the automatic transmission controller shown in FIG. 1A. An accelerator pedal signal AP, a shift-position signal SHIFT, a main shaft rotational speed NM, and an engine rotational speed NE are input to the electronic control unit (ECU). The ECU outputs signals to the first electromagnetic clutch 30 and the like.

Although it is not shown in FIG. 5, a pair of engageable members of each of the clutches C1 to C3, the brakes B1 to B3, and the TWC (F1) have a hydraulic pressure chamber. When the ECU sends a driving signal to energize a solenoid, a pump (not shown) supplies a fluid to the hydraulic chamber to operate each of the clutches and the brakes.

In the present embodiment, it is necessary to detect a fluid pressure applied to each of the clutches and the brakes in a control process described below. The fluid pressure can be detected by using a hydraulic pressure sensor. However, in the present embodiment, the hydraulic pressure is indirectly detected by using a time for which the oil pump is operated (the temperature of oil) and a time for which electric current is applied to a solenoid that serves to supply oil to the clutch or the brake. As a result, it is not necessary to use a hydraulic pressure sensor.

Figure 6:
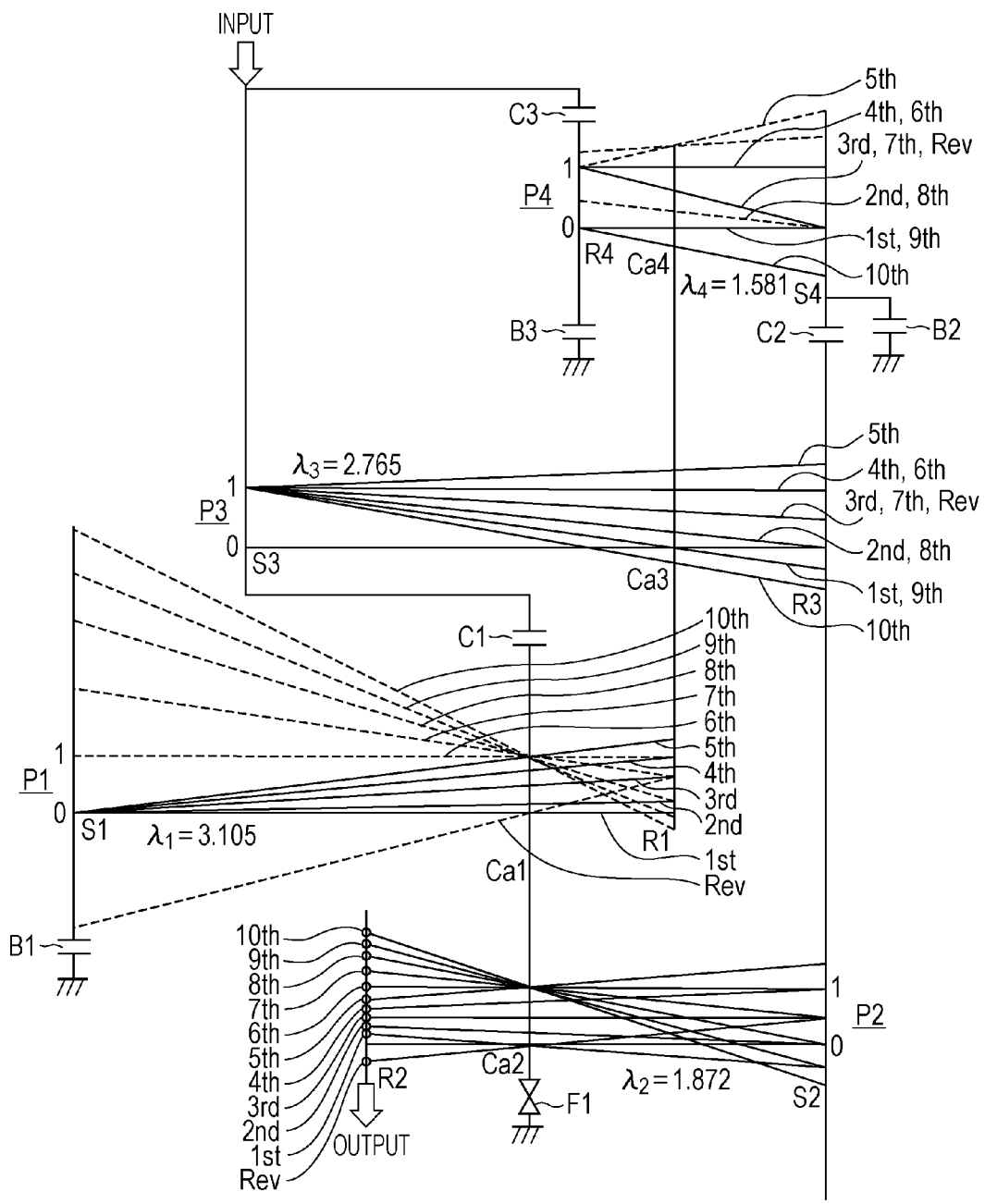
FIG. 6 is a velocity diagram of the four planetary gear mechanisms of the automatic transmission shown in FIG. 1A.

FIG. 6 is a velocity diagram of the automatic transmission shown in FIG. 1A. FIGS. 7A to 7C illustrate how the axle is locked when the automatic transmission is shifted up to first gear (or second gear) from an idling N control state to start the vehicle.

Figure 8A:
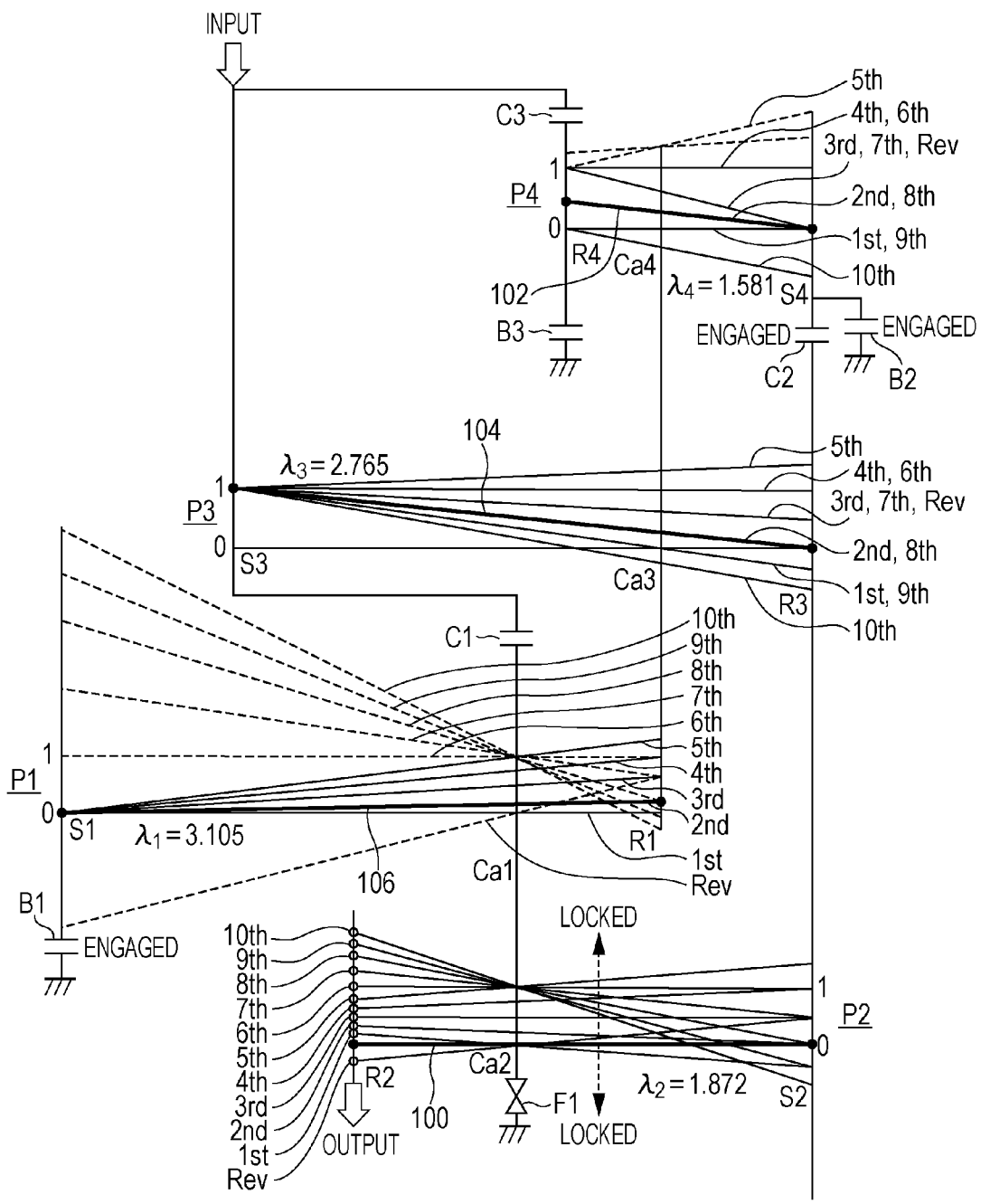
FIG. 8A illustrates, in the velocity diagrams in FIGS. 7A to 7C, a state in which the TWC is in reverse gear and locked for all gear ratios.
Figure 8B:
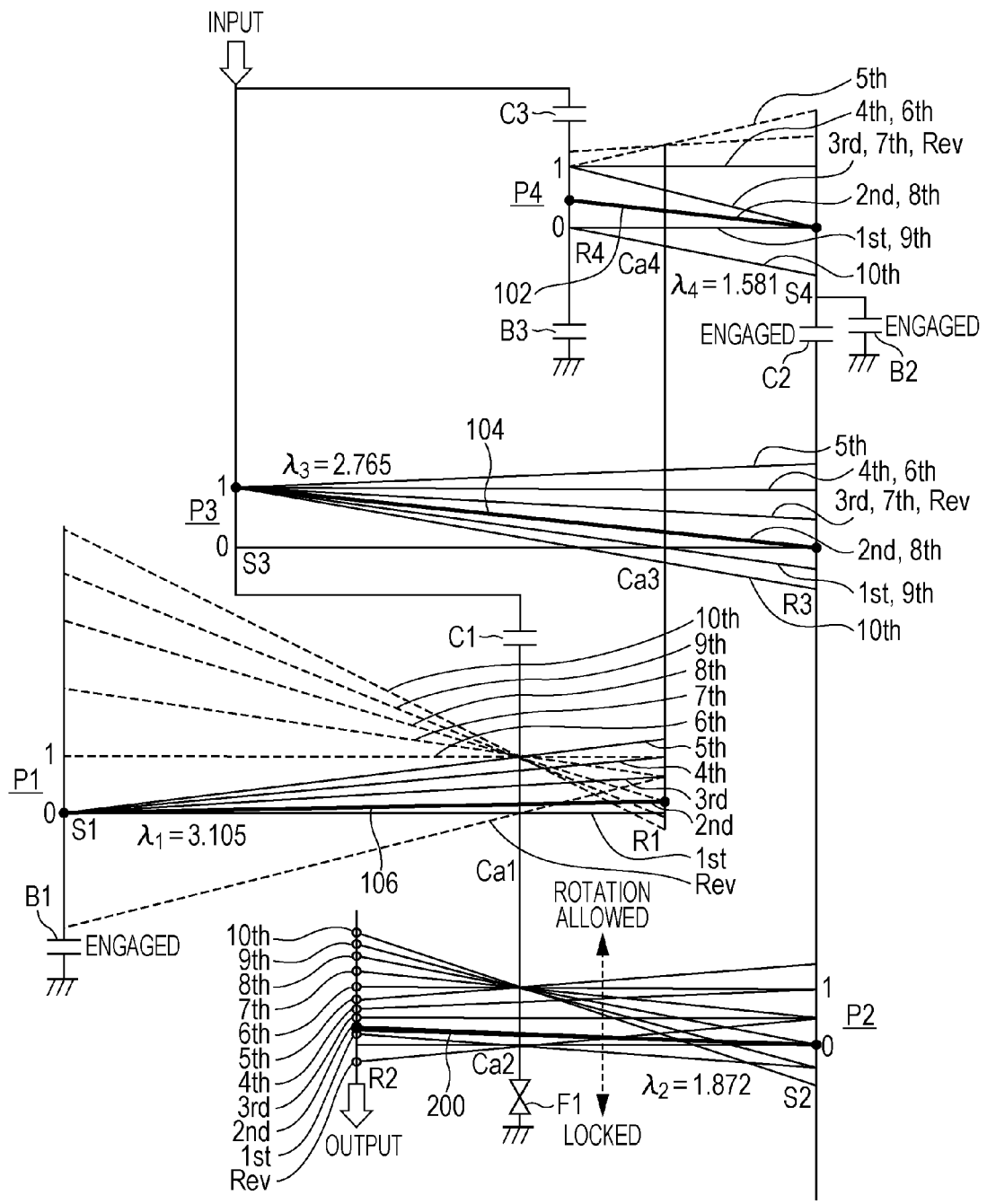
FIG. 8B illustrates, in the velocity diagrams in FIGS. 7A to 7C, a state in which the TWC is in forward gear, locked for first gear and reverse gear, and free for forward gears higher than first gear.

FIG. 8A illustrates a state in which the TWC (F1) is locked for all gears when the TWC (F1) is on the reverse (R) side regarding the velocity diagrams of FIG. 7A. FIG. 8B illustrates a state in which the TWC (F1) is locked for first gear and reverse gear and is free for second and higher forward gears when the TWC (F1) is on the forward (D) side regarding the velocity diagrams of FIGS. 7B and 7C.

FIG. 9 illustrates a control process according to the embodiment. In step S2 of FIG. 9A, whether or not conditions for idling N control are satisfied is checked. The conditions for idling N control are as follows: the brake pedal signal is ON (the brake pedal is depressed); the vehicle velocity is substantially zero; and the oil temperature is in a predetermined range. If these conditions are satisfied, the control proceeds to step S30, and idling N control is performed. As described in step S30, idling N control is performed by engaging the clutch C2 and the brake B2. When the clutch C2 and the brake B2 are engaged, the sun gear S4 of the planetary gear mechanism P4 is locked, and the sun gear S2 of the planetary gear mechanism P2, which is coupled to the clutch C2, is also locked.

Even when the sun gear S4 of the planetary gear mechanism P4 is locked, the input shaft is free because the clutch C3 is not engaged. In the idling N control mode, the input shaft is free and energy loss in the converter is reduced. Therefore, the fuel efficiency when performing idling N control is improved.

When the clutch C2 and the brake B2 are engaged and the rotational speed of the sun gear S2 of the planetary gear mechanism P2 is zero, as shown in the velocity diagrams of FIGS. 7A to 7C, the rotational speeds of the carrier Ca2 and the ring gear R2 of the planetary gear mechanism P2 are zero. The output of the ring gear R2 of the planetary gear mechanism P2 is the axial output, and unintentional backward movement of the vehicle is prevented as the rotational speed of the ring gear R2 is maintained at zero.

Regarding illustration of this control, refer to a velocity line 100 of the planetary gear mechanism P2 in FIG. 8A.

Next, a case where the conditions for idling N control are not satisfied in the control process shown in FIG. 9 will be described. Such a case occurs, for example, if the driver releases the brake pedal.

In this case, the process proceeds from step S2 to step S4, and whether the TWC (F1) is on the D-side or on the R-side is checked in step S6. As shown in the table of FIG. 3, the TWC (F1) is engaged only when the transmission in reverse (R) gear or first gear, and is disengaged when the transmission is in second gear or higher. In other words, in the control process shown in FIG. 9, when control of the transmission is changed from idling N control to normal control by changing the gear to second gear or higher, until the determination in step S8 becomes "YES" and it is determined in step S10 that a second-in-gear mode has been finished, control for entering the second-in-gear mode in step S12 is performed.

A case where control of the transmission is changed from idling N control to normal control in second gear (or higher) will be considered.

Prevention of Engagement Shock

First, the brake B1 is engaged. When the brake B1 is engaged, the sun gear S1 of the planetary gear mechanism P1 is locked and the rotational speed of the sun gear S1 is zero, the rotational speed of the carrier Ca1 of the planetary gear mechanism P1 is zero, and the rotational speed the carrier Ca2 of the planetary gear mechanism P2 is zero. Therefore, the rotational speed of the main shaft (the ring gear R2 of the planetary gear mechanism P2) of the transmission is controlled to be low. Therefore, when the vehicle starts from the idling N control mode at second or higher gear, the second-in-gear mode of step S12 is performed to prevent engagement shock.

A control process that is performed when control of the transmission is changed from idling N control to normal control in a low gear (i.e., first gear) will be described.

This case is a case where determination in step S2 is NO, determination in step S4 is YES, determination in step S6 is YES, and determination in step S8 is NO. In this case, the brake B1 is engaged in step S20. In step S22, the pressure of hydraulic fluid applied to the brake B1 is calculated. As described above, in the present embodiment, a sensor for detecting brake pressure is not used to detect backward movement of the vehicle in order to reduce the cost. The hydraulic pressure applied to the brake B1 in step S22 is based on an estimate that the hydraulic pressure would increase proportionally to the time elapsed since the brake B1 is first engaged in step S20. For a short time after the brake B1 is engaged, "pressure of the brake B1 #predetermined value B1" in step S22 is not satisfied, Therefore, "#predetermined pressure C2" having a non-zero value is applied to the clutch C2. The value of "#predetermined pressure C2" is set so as to prevent the vehicle from gradually moving backward as the engaging force of the clutch C2 weakens while first gear (or another low gear) is engaged ("pressure B1 #predetermined value B1" is not satisfied).

After a certain time has elapsed and "pressure B1 #predetermined value B1" is satisfied, the engaging force of the brake B1 increases. Accordingly, the carrier Ca2 and the ring gear P2 of the planetary gear mechanism P2 can be locked through the sun gear S1 and the carrier Ca1 of the planetary gear mechanism P1. Therefore, the clutch C2 is disengaged in step S26 because the vehicle will not move backward even if the clutch C2 is disengaged.

Figure 10A:
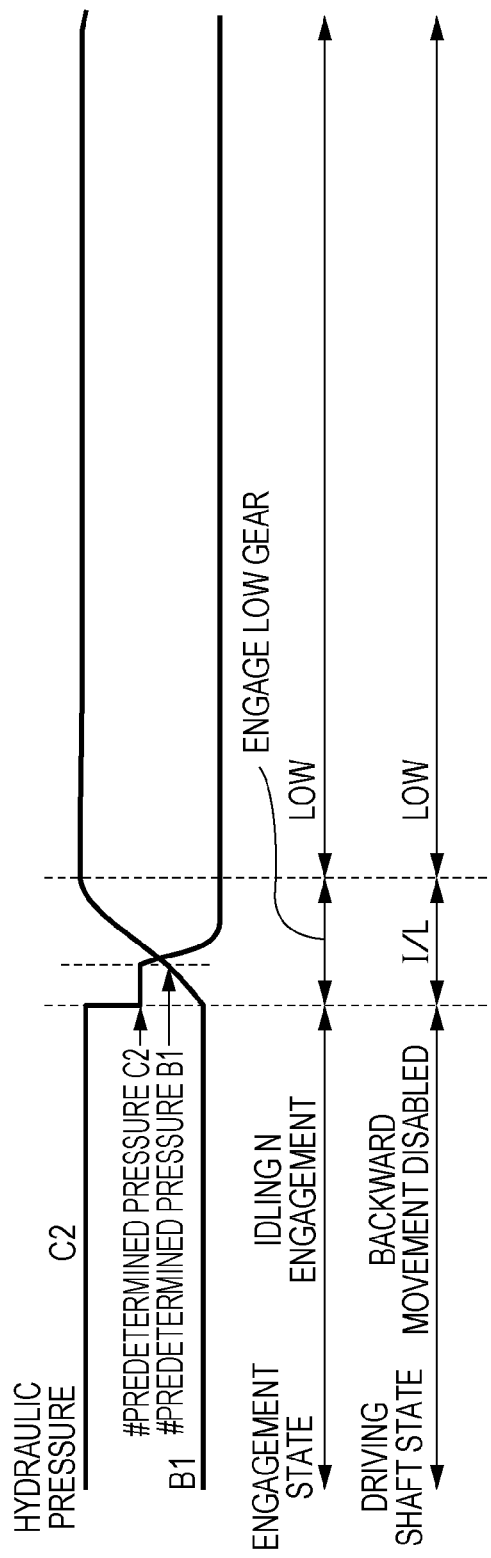
FIG. 10A illustrates control logic used in the control process of FIG. 9 to prevent a shift shock when changing from idling N control to first gear.

FIGS. 10A and 10B are timing charts showing changes in the hydraulic pressures, engagement states, and the states of the main shafts of clutches and brakes related to control that is performed to prevent engagement shock (steps S12 to S26). in accordance whether return to a low gear or return to a higher gear (second gear or higher) is performed in the control process of FIG. 9. In particular, FIG. 10A shows a control portion corresponding to steps S20 to S26, which is related to change to a low gear; and FIG. 10B shows a control portion corresponding to steps S10 to S14, which is related to change to second gear.

In FIGS. 10A and 10B and in the present specification, the term "idling N engagement" refers to an engagement state in which the automatic transmission according to the present embodiment (FIG. 1A), which performs an operation of engaging the clutch/brake for locking the output shaft of the transmission to prevent backward movement of the vehicle during idling, engages the cloth C2 and the brake B2 in order to lock the output shaft. In the present embodiment, when C2 and B2 are engaged, the output shaft of the transmission is locked (to prevent backward movement of the vehicle in idling N control) and the input shaft is set to be free (to improve the fuel efficiency by reducing the engine load).

In other words, in the present embodiment, the clutches and brakes that are related to "idling N engagement" are the clutch C2 and the brake B2 in FIG. 1A. The technology according to the embodiment of the present disclosure, with which backward movement of a vehicle is prevented when idling neutral control is performed when the vehicle stops, can be applied to automatic transmissions having various structures (in other words, various clutches and brakes). For any of such modifications, a combination of clutch/brake with which the output shaft and the input shaft of the transmission are set to be free is generally called "idling N engagement" in the present specification.

Others

In step S30 of FIG. 9, "the hydraulic pressure applied to B1 is set at a pressure with which B1 becomes half-engaged". By half-engaging the brake B1, the vehicle can move smoothly when idling N control is finished and gear is engaged.

Advantages of Embodiments

Advantage 1

Existing idling N control methods address the problem of backward movement of a vehicle, which may occur when control of the vehicle return from idling N control to normal control, by using an inclination angle sensor or by detecting a brake pressure. In contrast, the present embodiment prevents backward movement of a vehicle by engaging two engagement elements (C2 and B2) during idling N control so as to allow the input shaft to freely rotate while locking rotation of the output shaft in a reverse direction (or in both forward and reverse directions). Therefore, the present embodiment solves the above problem with the existing idling N control methods. That is, a sensor is not necessary, and the engine load can be reduced by creating a state in which the input shaft is free.

Advantage 2

In the idling N engagement, C2 and B2 are engaged. Therefore, change to first-gear-engaged state (in which B1 and B2 are engaged) can be set by switching between the engagement states of B1 and C2. As a result, the control structure according to the embodiment is simple. This is realized because the TWC, which can perform three or four different engagement operations, is used.

Advantage 3

The control process according to the embodiment is configured to prevent engagement shock. Thus, the present embodiment has an advantage in that unintentional backward movement of the vehicle can be prevented when stopping idling N control.

Advantage 4

In the state in which C2 and B2 are engaged, when the TWC is on the D-side, backward movement of the vehicle due to inclination can be avoided because the output shaft is locked in the reverse direction and is free in the forward direction. When the TWC is on the R-side, the output shaft is locked and movement of the vehicle in the backward and forward directions can be avoided.

Advantage 5

Responsiveness at the time of starting the vehicle is maintained by half-engaging the brake B1 during idling N control.

Advantage 6

The engagement state is changed from the idling N engagement to first gear by switching between the engagement states of C2 and B1 while maintaining the brake B2 to be engaged. At this time, the hydraulic pressure applied to C2 is maintained so that backward movement of a vehicle would not occur, and when the hydraulic pressure applied to B1 becomes a level at which backward movement does not occur, C2 is fully disengaged.

Advantage 7

When the TWC is on the D-side, the transmission is in idling N engagement state (in which both C2 and B2 are engaged). By engaging the brake B1, second gear becomes engaged, and then the clutch C2 is disengaged to engage first gear. As a result, engagement shock is reduced.

When the TWC is on the D-side, rotation in forward direction is free at the time of idling N engagement. Therefore, idling N engagement can be set when the vehicle is moving at a low speed.

According to an embodiment, an automatic transmission controller controls an automatic transmission that transmits a driving force from a drive source to a wheel of a vehicle while shifting the driving force by selecting a gear ratio from a plurality of gear ratios in accordance with a driving state of the vehicle.

The automatic transmission includes a starting mechanism connected to the drive source, a plurality of planetary gear mechanisms each including rotation elements that are a sun gear, a carrier, and a ring gear, and a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms.

The automatic transmission controller includes the following elements (A) to (C).

(A) a neutral controller that performs neutral control in which transmission of the driving force from the drive source to an output shaft is stopped so as to allow the mechanical engagement mechanism to switch the rotational directions for a forward gear and a reverse gear and to allow rotation in each of the forward gear and the reverse gear;

(B) a neutral control permission determiner that determines whether or not to permit the neutral control; and (C) an engagement controller that, when the neutral control determiner permits the neutral control, allows rotation of an input shaft of the automatic transmission, and that, in a case where the output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission.

The automatic transmission controller according the embodiment controls an automatic transmission for a vehicle that switches between a first gear and the reverse gear by switching a rotational direction of a mechanical engagement mechanism, such as a two-way clutch, that is capable of switching a rotational direction in which the two-way clutch allows rotation. The automatic transmission is capable of performing idling N control in which the driving force from a drive source is not transmitted to the output shaft of the automatic transmission when a predetermined condition is satisfied. When idling N control is performed, rotation of the input shaft is allowed, and a combination of engagements including the two-way clutch is selected with which the output shaft of the automatic transmission is fixed to the casing at least when the output shaft of the automatic transmission is rotated by a wheel of the vehicle in a rotational direction such that the vehicle moves backward.

With the embodiment of the present disclosure, movement of the vehicle in forward and backward directions is restricted by using a combination of engagements of the automatic transmission with which the input shaft is set free and the output shaft is held fixed. Therefore, backward movement of the vehicle can be prevented.

Control of transition from idling N control to forward first gear can be performed by changing only one engagement. Therefore, control can be easily performed.

With the embodiment of the present disclosure, a sensor for detecting a backward movement and a sensor for detecting the brake pressure, which are used in existing technologies, are not necessary. Therefore, backward movement of the vehicle can be restricted without providing the vehicle with special devices. As a result, the cost, the weight, and the fuel efficiency can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission controller for controlling an automatic transmission that transmits a driving force from a drive source to a wheel of a vehicle while shifting the driving force by selecting a gear ratio from a plurality of gear ratios in accordance with a driving state of the vehicle, the automatic transmission including
a starting mechanism connected to the drive source,
a plurality of planetary gear mechanisms each including rotation elements that are a sun gear, a carrier, and a ring gear, and
a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms,
the automatic transmission controller comprising:
a neutral controller that performs neutral control in which transmission of the driving force from the drive source to an output shaft is stopped so as to allow the mechanical engagement mechanism to switch the rotational directions for a forward gear and a reverse gear and to allow rotation in each of the forward gear and the reverse gear;
a neutral control permission determiner that determines whether or not to permit the neutral control; and
an engagement controller that, when the neutral control determiner permits the neutral control, allows rotation of an input shaft of the automatic transmission, and that, in a case where the output shaft of the automatic transmission is rotated by a wheel of the vehicle in a rotational direction such that the vehicle moves backward, sets the plurality of engagement mechanisms including at least the mechanical engagement mechanism so as to fix the output shaft of the automatic transmission to a casing of the automatic transmission.

2. The automatic transmission controller according to claim 1,
wherein the engagement mechanisms commonly involved in combinations of engagements of the engagement mechanisms for setting a lowest forward gear and the reverse gear include
the mechanical engagement mechanism,
a first brake that fixes a rotation element of a second planetary gear mechanism to the mechanical engagement mechanism, the second planetary gear mechanism being different from a first planetary gear mechanism including a rotation element that is held fixed by the mechanical engagement mechanism, and
a first clutch that connects a rotation element of the second planetary gear mechanism that is held fixed by the first brake, a rotation element of the first planetary mechanism that is held fixed by the mechanical engagement mechanism, and a rotation element that is not connected to the output shaft of the automatic transmission.

3. The automatic transmission controller according to claim 2,
wherein a first engagement mechanism, which is one of the engagement mechanisms that is included in the combination of engagements with which the lowest forward gear is set and which is not engaged in the neutral control, is engaged to such an extent that the first engagement mechanism does not generate an engaging force while the neutral control is performed.

4. The automatic transmission controller according to claim 3,
wherein a combination of the mechanical engagement mechanism, the first brake, the first clutch, and one of the engagement mechanisms that is included in the combination of engagement mechanisms for setting the lowest forward gear and that is not engaged during the neutral control is a combination of engagement mechanisms for setting a predetermined forward gear that is higher than the lowest forward gear, the combination of the mechanical engagement mechanism, the first brake, and the first clutch being a combination of engagement mechanisms that are engaged during the neutral control, and
wherein the combination is changed to the combination of engagements that sets the lowest forward gear after setting the predetermined forward gear.

5. The automatic transmission controller according to claim 1,
wherein, in a case where the neutral control is performed when the vehicle is moving in a forward direction at a predetermined velocity or lower, a rotational direction of the mechanical engagement mechanism is switched to a direction that allows movement of the vehicle in the forward direction.

6. An automatic transmission controller for controlling an automatic transmission that transmits a driving force from a drive source to a wheel of a vehicle while shifting the driving force by selecting a gear ratio from a plurality of gear ratios in accordance with a driving state of the vehicle, the automatic transmission including a starting mechanism connected to the drive source; a plurality of planetary gear mechanisms each including rotation elements including a sun gear, a carrier, and a ring gear; and a plurality of engagement mechanisms that connect or hold fixed the rotation elements of the planetary gear mechanisms and that set the plurality of gear ratios of the automatic transmission by means of a combination of engagements between the plurality of engagement mechanisms and the rotation elements, one of the plurality of engagement mechanisms being a mechanical engagement mechanism that permits switching of a rotational direction of one of the rotation elements of the plurality of planetary gear mechanisms, the automatic transmission controller comprising:
a neutral controller configured to perform neutral control in which transmission of the driving force from the drive source to an output shaft is stopped so as to allow the mechanical engagement mechanism to switch the rotational directions for a forward gear and a reverse gear and to allow rotation in each of the forward gear and the reverse gear;
a neutral control permission determiner configured to determine whether or not to permit the neutral control; and
an engagement controller configured to allow rotation of an input shaft of the automatic transmission in a case where the neutral control determiner permits the neutral control and configured to set the plurality of engagement mechanisms including at least the mechanical engagement mechanism so as to fix the output shaft of the automatic transmission to a casing of the automatic transmission in a case where the output shaft of the automatic transmission is rotated by a wheel of the vehicle in a rotational direction such that the vehicle moves backward.

7. The automatic transmission controller according to claim 6, wherein engagement mechanisms commonly involved in combinations of engagements of the plurality of engagement mechanisms for setting a lowest forward gear and the reverse gear include the mechanical engagement mechanism, a first brake that fixes a rotation element of a second planetary gear mechanism to the mechanical engagement mechanism, the second planetary gear mechanism being different from a first planetary gear mechanism including a rotation element that is held fixed by the mechanical engagement mechanism, and a first clutch that connects a rotation element of the second planetary gear mechanism that is held fixed by the first brake, a rotation element of the first planetary mechanism that is held fixed by the mechanical engagement mechanism, and a rotation element that is not connected to the output shaft of the automatic transmission.

8. The automatic transmission controller according to claim 7, wherein a first engagement mechanism, which is one of the plurality of engagement mechanisms that is included in a combination of engagements with which the lowest forward gear is set and which is not engaged in the neutral control, is engaged to such an extent that the first engagement mechanism does not generate an engaging force while the neutral control is performed.

9. The automatic transmission controller according to claim 8, wherein a combination of the mechanical engagement mechanism, the first brake, the first clutch, and one of the plurality of engagement mechanisms that is included in a combination of engagement mechanisms for setting the lowest forward gear and that is not engaged during the neutral control is a combination of engagement mechanisms for setting a predetermined forward gear that is higher than the lowest forward gear, a combination of the mechanical engagement mechanism, the first brake, and the first clutch being a combination of engagement mechanisms that are engaged during the neutral control, and wherein the combination is changed to a combination of engagements that sets the lowest forward gear after setting the predetermined forward gear.

10. The automatic transmission controller according to claim 6, wherein, in a case where the neutral control is performed when the vehicle is moving in a forward direction at a predetermined velocity or lower, a rotational direction of the mechanical engagement mechanism is switched to a direction that allows movement of the vehicle in the forward direction.

11. The automatic transmission controller according to claim 6, wherein the neutral control permission determiner configured to determine whether or not to permit the neutral control based on whether a brake pedal is depressed, whether the vehicle velocity is substantially zero, and whether a temperature of an oil in a clutch or a brake is in a predetermined range.

* * * * *